Oct. 9, 1928.  
E. M. BALLOT  
1,687,191  
SUSPENSION WITHOUT AXLES FOR MOTOR VEHICLES  
Filed Jan. 5, 1925  3 Sheets-Sheet 1

INVENTOR.  
E. M. Ballot  
By William C. Linton  
Atty.

Oct. 9, 1928.

E. M. BALLOT

SUSPENSION WITHOUT AXLES FOR MOTOR VEHICLES

Filed Jan. 5, 1925

INVENTOR.
E. M. Ballot.
By William C. Linton
Atty.

Oct. 9, 1928.  
E. M. BALLOT  
1,687,191  
SUSPENSION WITHOUT AXLES FOR MOTOR VEHICLES  
Filed Jan. 5, 1925   3 Sheets-Sheet 3

INVENTOR.  
E. M. Ballot.  
By William C. Linton  
Atty.

Patented Oct. 9, 1928.

1,687,191

UNITED STATES PATENT OFFICE.

ERNEST MAURICE BALLOT, OF PARIS, FRANCE.

SUSPENSION WITHOUT AXLES FOR MOTOR VEHICLES.

Application filed January 5, 1925, Serial No. 646, and in France January 14, 1924.

The present invention relates to a suspension without axles for motor vehicles. According to the said invention, the wheels are independent of each other and the support for each wheel is connected with the vehicle frame by an elastic system comprising two superposed springs, of unequal length, which are pivoted to the wheel support, one being situated above and the other below the axis of the wheel.

In order to maintain a constant value for the gauge of each pair of wheels, it is preferable to adopt for the springs pivoted to a given wheel suitable lengths which are in inverse ratio to the distances of the corresponding pivoting points from the ground.

The appended drawings which are given by way of example show various embodiments of the invention as applied to motor vehicles.

Figure 1:
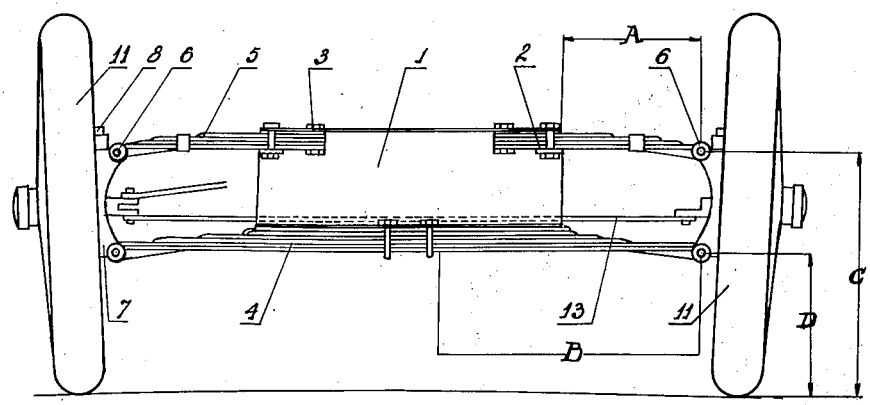

Fig. 1 is an end view of a pair of front steering wheels.

Figure 2:
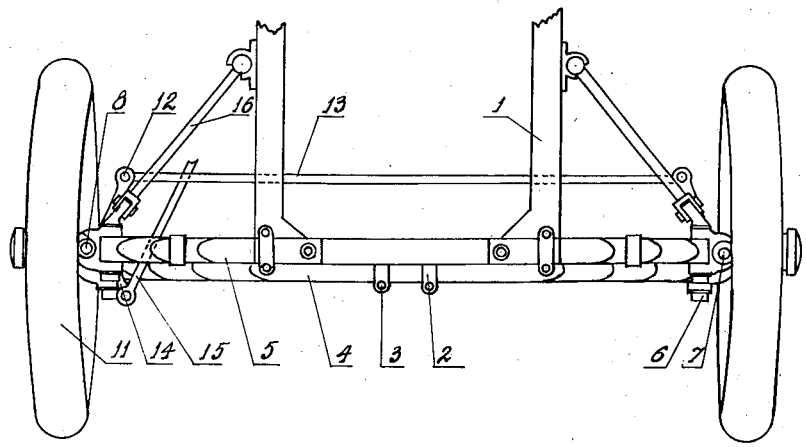

Fig. 2 a corresponding plan view.

Figure 3:
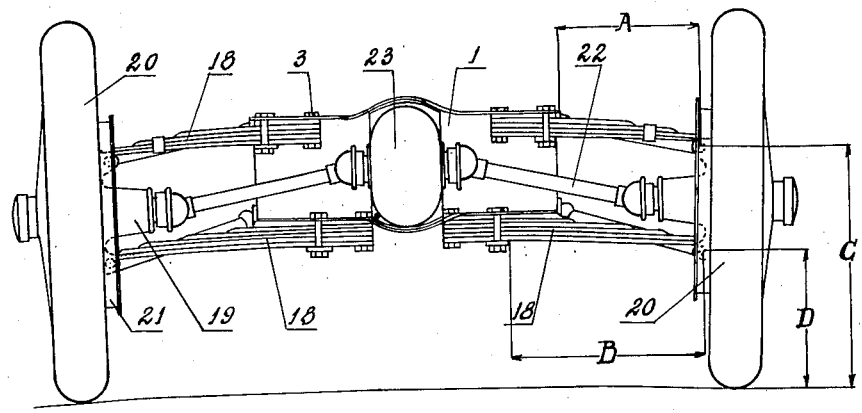

Fig. 3 is an end view of a pair of rear driving wheels.

Figure 4:
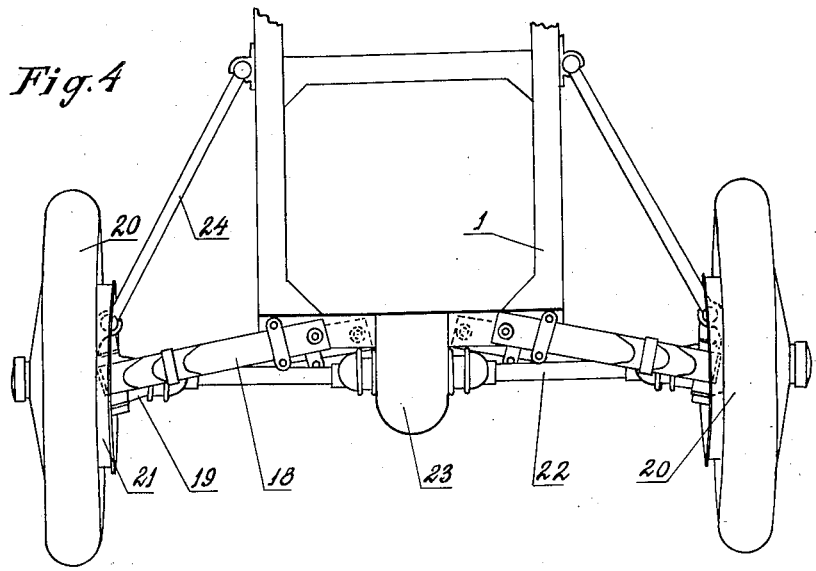

Fig. 4 a corresponding plan view.

Figure 5:
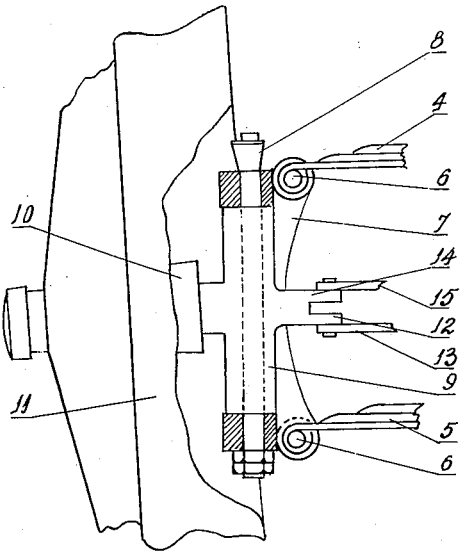

Fig. 5 relates to the connection for a steering wheel and the corresponding springs.

Figure 6:
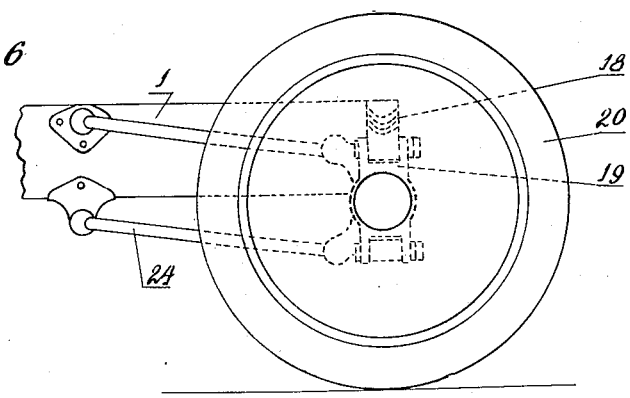

Fig. 6 is an elevational view of the traction members for the rear wheel set.

In the said figures, 1 is the vehicle frame. To the front part of the said frame, Figs. 1 and 2, are secured by means of the straps 2 and bolts 3, on the one band against the upper face of the frame a plate spring 4 disposed transversally with respect to the centre line of the vehicle, and on the other hand against the lower face two half plate springs 5 which are parallel to the first and are situated in the same vertical plane as the latter.

The outer ends of the said springs are pivoted in pairs through the medium of the shafts 6 to the supports 7. The latter are each traversed by a pivot spindle 8 upon which is mounted (Fig. 5) a sleeve 9 secured to the wheel journal 10 upon which is mounted the corresponding wheel 11 in the known manner.

All suitable means for the connection and the steering of the front wheels may obviously be adopted. For this purpose, as shown in the drawings, the sleeves 9 have mounted thereon the arms 12 which are connected together by a coupling bar 13, whilst the projection 14 secured to one of the said sleeves provides for the transmission of the movements due to the steering control through the medium of the rod 15.

In order to afford the proper rigidity for this structure, to balance the actions, and to provide for the thrust of the steering wheels, I dispose laterally two groups of traction members 16 which are pivoted at one end to the supports 7 and at the other to the main side beams of the vehicle frame 1.

The rear part of this latter, Figs. 3 and 4, is also provided, against its upper and lower faces, with the half springs 18 of unequal length which are parallel to each other and perpendicular to the centre line of the vehicle, and are pivoted to the supports 19. These latter which are adapted to receive the driving wheels 20, are each provided for the purpose with a brake drum 21 and with transmission elements which are suitably connected, through the medium of a Cardan shaft 22, to the differential 23.

Suitable rods 24 are further disposed between the said supports and the vehicle frame in order to impart to the latter the driving thrust or the braking effort.

The dimensions and the position of the springs are determined in all cases in such manner as to provide for a practically constant wheel gauge. To this end, each wheel must be made to pivot transversally on its point of contact with the ground; in this connection it should be noted that the ratio of the variations in the horizontal lengths A and B and in the flexible parts of the spring plates will depend firstly upon the ratio of the distances C and D between the lower and the upper shafts and the points of contact of the wheels with the ground, and secondly upon the original flexions given to the springs.

It is shown in practice that in order to provide for the constant spacing of the wheels of a given pair, it is advantageous to obtain substantially for each wheel the condition:

$$\frac{A}{B} = \frac{D}{C}$$

In virtue of the separate elastic connections which are provided between the wheel supports and the vehicle frame, each wheel is enabled to move independently of the others under the effect of a difference of level in the road; this will reduce the oscillations of the vehicle frame to a minimum and the vehicle will thus travel under approved conditions.

The connecting springs may be so disposed that all the springs will support the weight, or otherwise a part of the springs serve as supports and the remainder as shock absorbers.

The shock absorbing springs are so disposed as to be inoperative in the position corresponding to the total static load, and to brake the rise and descent of the vehicle frame on either side of this position.

Claims:

1. A suspension without axles for vehicles comprising a chassis, a pair of wheels, a single spring having its ends pivoted to said wheels with its center secured to the center of said chassis, said spring being normally under tension, and a pair of springs each having one end pivoted to a wheel in vertical alignment with the pivot of said first spring and having its remaining end fixedly secured to the chassis adjacent the side thereof.

2. A suspension without axles for vehicles, comprising a chassis, a pair of wheels, a main spring secured to the chassis and having its ends pivoted to the wheels, said spring being normally under tension, and a relatively short spring for each wheel paralleling said main spring and having one end pivotally connected to its respective wheel, and having its remaining end fixedly secured to the chassis, said relatively short spring being normally untensioned.

In witness whereof I have hereunto set my hand.

ERNEST MAURICE BALLOT.